United States Patent [19]
Horvath

[11] Patent Number: 6,101,733
[45] Date of Patent: *Aug. 15, 2000

[54] SAW BLADE ALIGNMENT TOOL

[76] Inventor: Steve Horvath, 1618 Liberty, Toledo, Ohio 43605

[*] Notice: This patent is subject to a terminal disclaimer.

[21] Appl. No.: 09/049,657

[22] Filed: Mar. 23, 1998

[51] Int. Cl.[7] .............................. B27G 23/00; G01B 3/56; B43L 7/00
[52] U.S. Cl. ................. 33/628; 33/424; 33/640; 33/633; 83/522.18
[58] Field of Search .............................. 33/628, 114, 424, 33/534, 626, 630, 640, 641, 632, 633, 427, 429, 474, 479, 481; 83/421, 522.16, 522.15, 522.17, 522.18, 522.25

[56] References Cited

U.S. PATENT DOCUMENTS

2,588,079  3/1952  Boehm ........................................ 33/479
4,776,250  10/1988 Julius ........................................ 33/474
5,632,096  5/1997  Horvath ..................................... 33/628

Primary Examiner—Christopher W. Fulton
Attorney, Agent, or Firm—Paul F. Stutz

[57] ABSTRACT

A device of utility in precisely setting the angular relationship of a circular saw blade of radial bench type power saw, which includes a special protractor defined by removing adjoining segments of the linear leg and the curved leg thereof, and a modified T-square including a head piece having a curvature matching that of the curved leg of the protractor and a connected ruler blade extending radially toward the center of said protractor, said T-square being improved in that the thickness of the head piece is greater than that of the ruler blade and the location of the ruler blade is such that the blade can be located on either face and still use an upper and lower lip for sliding contact with the circular edge of the protractor, whereby two T-squares are not necessary as in my prior U.S. Pat. No. 5,632,096.

17 Claims, 4 Drawing Sheets

SAW BLADE ALIGNMENT TOOL

The present invention relates to the machine shop art. More particularly the present invention relates to a novel tool device of utility in the wood working art, and, most particularly, to the wood working art as pertains to what may be termed expensive woods such as teak, cherry, and others known in tile art.

My basic invention is disclosed, illustrated and claimed in my U.S. Pat. No. 5,632,096, issued May 27, 1997. Since the issuance of my just-mentioned patent, I have been working with my device, as therein illustrated, shown and claimed, and have discovered an improvement in the nature of a simplification which greatly enhances the utility of my device and, at the same time, results in economy of construction, specifically in reducing the number of component parts necessary.

In the interest of full disclosure I have included in the present Specification the text of my U.S. Patent following the heading "U.S. Pat. No. 5,632,096" at page 6of this Specification.

In order to understand and appreciate the improvement to which the present invention is directed, the text of my U.S. Pat. No. 5,632,096 appearing hereinafter at page 6 should be reviewed in sufficient detail as to understand the nature, substance and details of my original improvement in the tool in question.

It is an object of the present invention to provide a simpler, more expedient combination of parts.

It is another object of the present invention to provide a device which is easier to use for the intended purpose.

Figure 1:
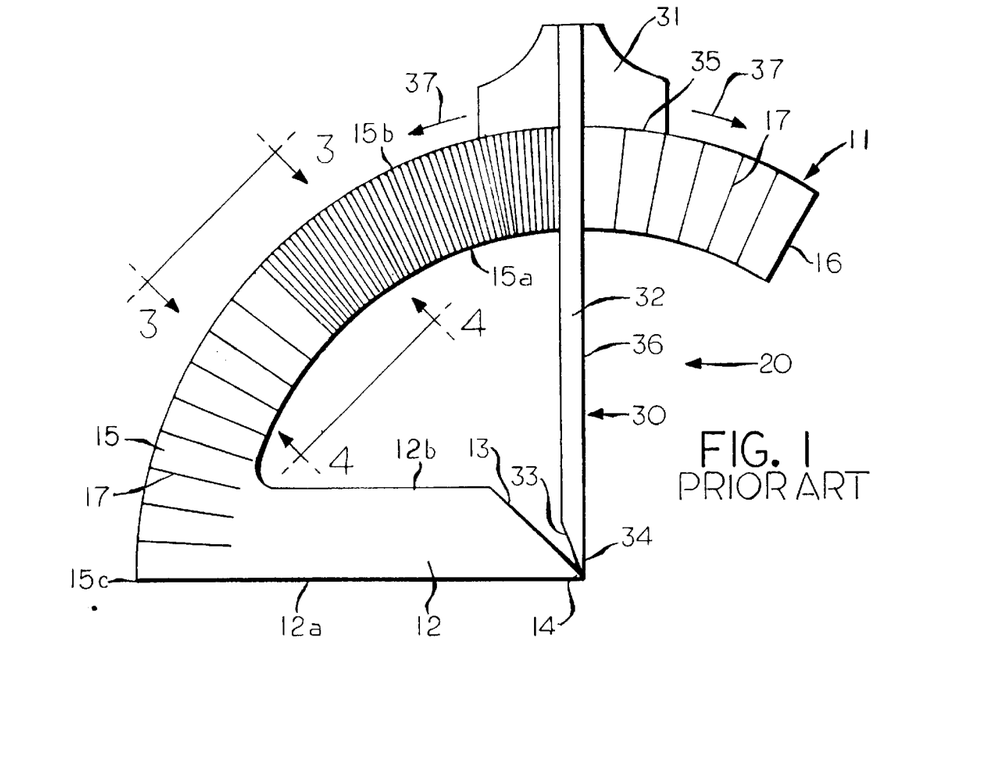
FIG. 1 is the top plan view of the prior art tool device consisting of a truncated protractor and a modified T-square.
Figure 2:
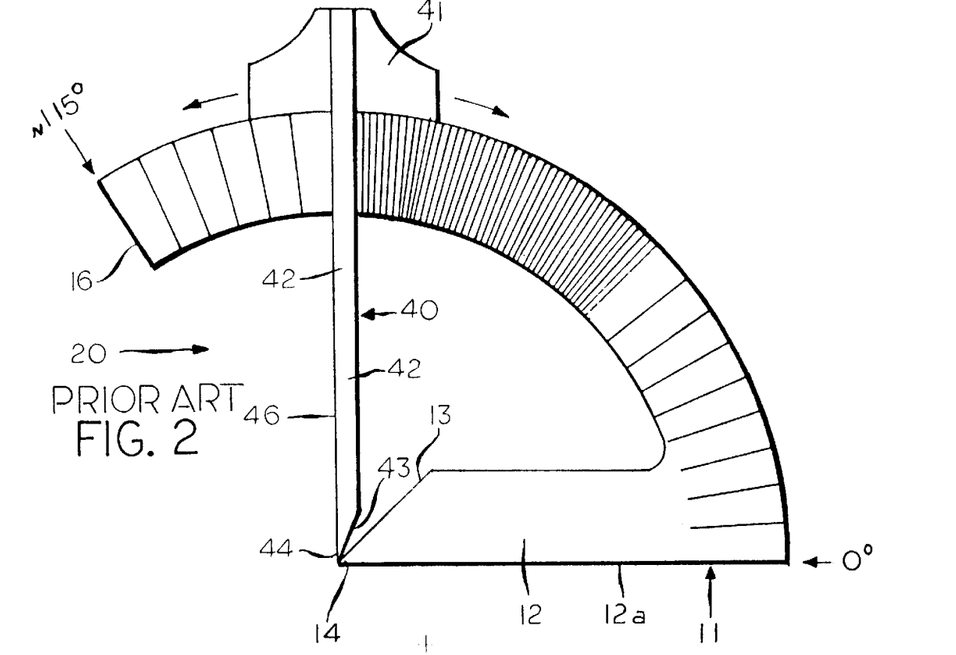
FIG. 2 is likewise a top plan view of the prior art tool device but, with the truncated protractor shown inverted for a purpose to be explained.

It is a further object of the present invention to provide a simpler combination of parts which, in particular, avoids the necessity of having two of the modified T-square components shown in FIG. 1 and FIG. 2 and identified by the numerals 30 and 40 respectively.

It is still another object of the present invention to provide a tool device which is more easily stored and which additionally entails less risk of loss than the previous embodiment, wherein loss of one of the T-squares would render the device relatively inoperable or of severely limited utility.

These and other objects of the present invention will become apparent to those skilled in the art from the following detailed description taken in conjunction with the annexed sheets of drawings of which there is presented, for purposes of illustration only, the preferred embodiment of the present invention.

Figure 9:
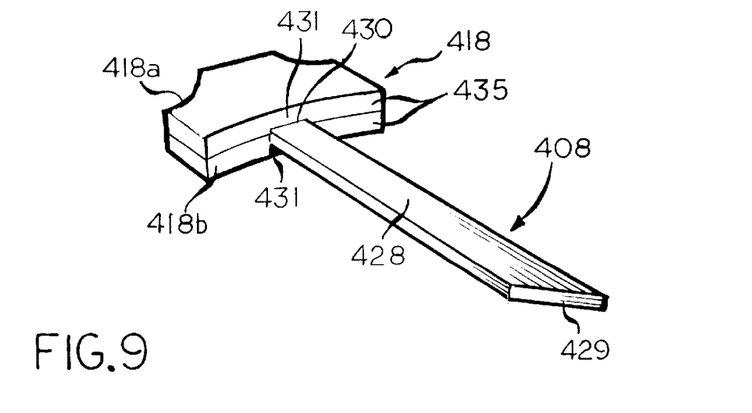
FIG. 9, is a three-quarter perspective view of the improved and modified T-square of the present invention.

In its simplest embodiment, the present invention contemplates an improved T-square construction useful in the environment described and which is universal in that either planar face of the improved T-square may be located in the flat facing relationship shown in FIG. 9.

Figure 8:
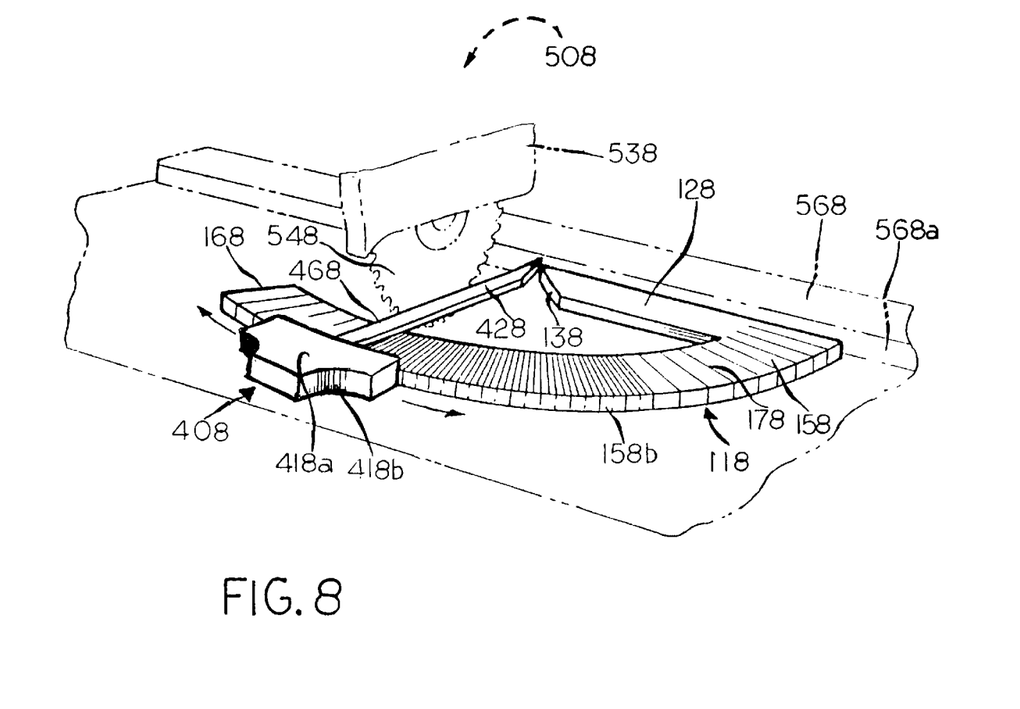
FIG. 8, is a three-quarter, perspective/oblique view, and being essentially a mirror image of FIG. 5 excepting for the presence of the improved T-square member in accordance with the principle embodiment of the present invention, the improved T-square, being shown in operative relationship with the protractor and in operative relationship with a radial power saw.

Referring now more specifically to the drawings, and particularly to the improved T-square embodiment; shown in FIGS. 8 and 9; detailed reference should be made to the following description.

Referring specifically to FIG. 8, the improved tool device of the present invention consisting of the truncated protractor member and improved T-square is shown resting flushly on the horizontal surface of Table T of a radial power saw apparatus 508 which is not shown as such is no part of the present invention. In so far as necessary, FIG. 5 may be referred to for a view of the radial power saw which as shown in FIG. 8 includes a safety shield component 538 partially enclosing the upper half of saw blade 548 which, as shown is in vertical/perpendicular relationship with the table T and positioned/located flushly against the outer edge 468 of ruler blade component 428 of the T-square 408.

The table T bears an elongate/linear fence 568, including an edge 568*a* against which the base leg 128*a* of protractor 118*a* abuts, whereby the entire protractor 118 will move slidably via the sliding contact of the leg 128 against the edge 568*a* of the fence 568. The fence 568 serves as a reference base for adjusting and setting the angular relationship of the saw blade 548 for the particular job of sawing per print or specification. The saw blade 548 is shown perpendicular to the fence 568.

An appropriate adjustable nut (not shown) allows the blade 548 to be pivoted to any desired angular relationship with respect to the fence 568.

For example, if the specification or print calls for cutting piece's of expensive teak wood at an angle of 30 degrees from the normal or perpendicular position of the ruler blade 428 (which as shown in the drawing defines an angle of 90 degrees with respect to the fence) one simply slides the head piece along the curved, periphery 158*b* of the circular leg, 158 until a radial distance of 30 degrees, as read on the degrees scale 178, is achieved. The T-square blade will then define an angle of 30 degrees with respect to the edge 568*a* of the fence 568. Alternatively, the same angular relationship of 30 degrees may be achieved by sliding the head piece portion of the T-square a distance of 7.5 inches as measured on the outer periphery 158*b* as determined by intersection of the edge 468 of ruler 428 with the inch markings on said periphery 158*b*. As previously indicated, these markings in one-quarter inch increments each correspond to one degree, so that 30 degrees×¼=7.5 in. As explained elsewhere; the use of the inch markings on the periphery 158*b* rather that degree markings on the upper surface on the leg 158 is found to be more convenient for an unskilled operator.

It should be understood that the abutment of the face of the saw blade 548 with the edge 468 of ruler 128, together with the alignment and registration of the terminal ends of the base leg 128 and the ruler 428, coupled with the proper reading on the periphery ensures the proper and desired angular relationship of the saw blade with respect to the fence, and of course with respect to the piece of teak wood being cut. It then becomes a simple matter to tighten the appropriate nut to fix or set the angular relationship of the blade, whereupon the T-square 408 can be removed/lifted from the site, while at the same time due to the space provided by the truncated structure of the protractor permits the protractor to be moved slidably along the table with no interference with the saw blade itself. Without such space between the bias cut edge 138 of the base leg 128 and the radial cut edge 168 of the circular leg 158, it would be necessary to go to the trouble and inconvenience of raising the saw assembly 508 including the power components in order to move the protractor from its otherwise interfering location with the sawing operation.

Figure 5:
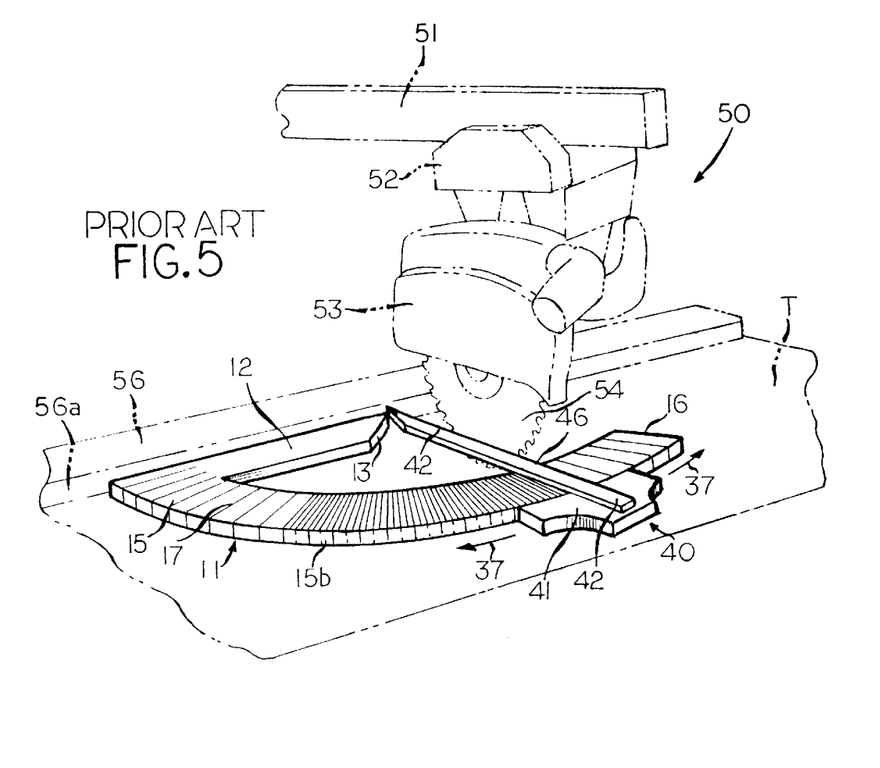
FIG. 5 is a three-quarter perspective view of the prior art device shown in operative relationship with a radial power saw.

Reference is now directed to FIG. 9 for a description of the construction of the improved T-square of the present invention as compared to the T-square construction shown in FIGS. 1 and 2 and 5 of my U.S. Pat. No. 5,632,096. At this juncture, a quick reference to these figures and the text describing same reveals the structure of T-square 30 and T-square 40 which require the use of two T-squares.

In contrast, the modified, improved T-square of the present invention, as shown in FIG. 9, identified by the reference numeral 408, includes an elongate blade 428 which is bias cut as shown and as in the previous embodiment. The head piece 418 however, is composed of two congruent head pieces 418a and 418b in mutual flush relationship, each containing a groove 430 in mutual registration to define a recessed slot for receiving the end of the blade 428 opposite the bias cut 429. The congruent segments 418a and 418b are secured to each other in the manner shown in the drawing by any suitable fastening means to yield the unitary, modified T-square 408 having the curved edge 435 matching the curved edge 158b of the truncated protractor of FIG. 8 for a smooth sliding relationship whereby the appropriate angular relationship and alignment operations can be performed. Furthermore, the thickness of the headpiece 418 is greater than of the ruler blade 428 and the positioning of the filer blade is such, that the blade can be located in an inverted relationship and still yield an upper and lower lip portion 431 of curved linear edge 435 for sliding contact with the circular edge of the protractor 158b. Such could not be accomplished with either of the original T-squares, 30 or 40 since the headpiece thereof is fastened to only one side of the linear blade and cannot be used in inverted position as lacks lips 431 for contact regardless of position of T-square.

The Text of U.S. Pat. No. 5,632,096 follows:

SAW BLADE ALIGNMENT TOOL

The present invention relates generally to the machine shop art. More particularly the present invention relates to a novel tool device of utility in the wood working art, and, most particularly, to the wood working art as pertains to the what may be termed expensive woods such as teak, cherry, and others known in the art.

In the fabrication and sawing of woods, it is usually necessary to employ a radial, bench type power saw in cutting the planer pieces of wood at a particular and specific angle in accordance with that desired as perhaps illustrated in a blue print or shop print of the part being fabricated.

The more precisely accurate the angle, the better will the cut piece fit into the structure of which it is a part such as price of furniture, cabinetry or the like.

Now commercial bench type, radial, power saws frequently embody or incorporate an angle setting guide integral with the machine. This usually takes the form of a built-in circular guide element with degree markings and provisions for loosening the power saw device via set screws, wing nut type devices or the like; then adjusting the saw so that an index lines up with the proper degree marking on the circular member. These have been found to be extremely inaccurate, eg. rarely accurate to within 3 degrees. Inaccuracies in sawing the angle desired for a particular object piece of wood, of course, yields waste since the wood piece cut at a wrong angle will not match in forming the desired assembly of pieces.

To reduce, eliminate or avoid the waste, a system of trial and error has become common practice in the shop. First, an initial cut is made by locating the practise piece of wood against the table fence of the commercial power saw apparatus and then proceeding with an angle cut which is measured and usually found to be inaccurate. Then the blade angle is adjusted to a second trial angle. Another cut is then made on a second piece of wood at the second trial angle. Measurement usually reveals error and the necessity of a third adjustment of the blade to yield precisely the desired angle. This "trial and error" method is usually necessary to arrive at the angle desired, before commencing the, saw cut on the piece of expensive wood with some assurance or confidence that the angle of cut will be that desired, as indicated on the print being followed on the particular job. Repetitive commercial production can then proceed, recognizing that after a time it is usually necessary to recheck the angle setting.

Clearly and obviously the trial and error method consumes a considerable amount of time and yields a considerable amount of waste. Both of these translate into higher cost of the finished item which could be reduced, and can be reduced, by the use of the tool device of the present invention, which allows the radial bench type power saw to be accurately and quickly adjusted to the precise print angle or the precise angle desired with confidence so that the cut will be accurate and accomplished in a minimum amount of time and with no waste thereby reducing both time and materials necessary for a particular job or jobs.

Over the years, a number of tools, gauges, guides, and such devices and apparatus have been developed and are described in the patent art. The following patents disclose such devices; U.S. Pat. No. 1,601,645; 2,595,322; 4,315, 373; 4,608,761; 4,779,354; 4,843,728; 5,121,553; 5,121, 554. The devices shown in the foregoing patents, however, while of interesting historical significance do not serve the purpose of the tool device of the present invention. The devices illustrated in the foregoing patents are exceptionally complicated, and, additionally, fail to perform satisfactorily. Others of the device, as shown, are actually directed to different purposes and are structurally complicated; composed of too many parts and even then fail to accomplish the accuracy/precision and speed possible with utilization of the tool of the present invention.

It is a principal object to the present invention to provide an improved, yet simplified tool device of utility in adjusting/setting the circular saw blade of a radial, bench type, power saw at a precise cutting angle as desired or per print.

It is another object of the present invention to provide such a combination protractor, T-square tool device which features an elongate base leg of precise dimension, to wit 14$\frac{5}{16}$ inch, thus yielding a precise gauge on the outer perimeter of the curved leg in which quarter inch markings from 0 to 90 degrees, each correspond to a single degree of arc and thus most convenient for the person using the device to set the angle desired by measuring in inches that corresponding to the degrees according to the scale, 1 inch equal 4 degrees.

It is a further feature of the present invention that the device is so designed that it can be used on one face, or the other, depending upon the particular angle as measured from the base leg as desired for the saw blade in accordance with the shop print or the like.

Still another object of the present invention is to provide such a tool device consisting of the truncated protractor member and modified T-square which is adapted for setting not only the desired horizontal angle of the saw blade but the departure of the saw blade from vertical as desired for bias cuts.

It is a further object of the present invention to provide a device, as described, which is extremely useful, convenient, simple, and speedily manipulated as to translate the desired shop print angle to the work piece thereby avoiding trial cuts and other errors and/or the need for trial cuts.

The foregoing objects and, as well, other objects of the present invention will become apparent to those skilled in the art from the following detailed description, taking in conjunction with the annexed sheets of drawings inclusive of seven Figures, in which there is illustrated the precise embodiment of the present invention in terms of its component parts, and, as well, illustrating the use of the device on a various types of power saw and the integral cooperating table usually associated therewith.

In its simplist embodiment the present invention comprises, in combination, a truncated protractor in which half of the base leg and less than half of the adjoining angular segment has been broken away, said protractor including angular markings and a cooperating modified T-square having a head piece adapted to movably engage the outer perimeter of the remaining arc portion of the protractor, while the elongate, central ruler portion extends radially and has a bias cut end adapted for registration with the bias cut end of the base leg.

Figure 3:
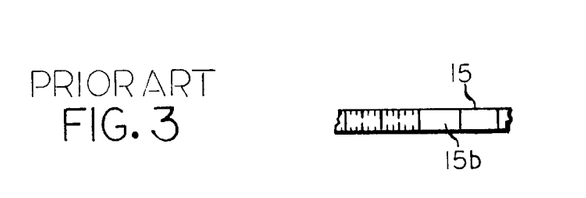
FIG. 3 is an edge view taken on the line 3—3 in FIG. 2.
Figure 4:
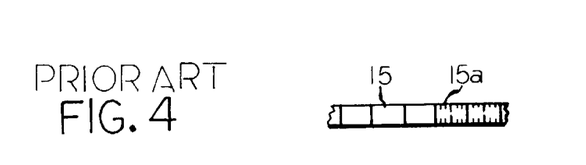
FIG. 4 is an edge view like FIG. 3 but taken on the line 4—4 in FIG. 2.

Referring now more specifically to the drawings, there is disclosed, in FIG. 1, the tool device of the invention comprising the truncated protractor 11, and the modified T-square 30 in mutually operative relationship. The base leg 12 of the protractor is bias cut on the line 13 as to intersect the center of the base leg (before cutting); while the circular leg 15 is radially cut at 16 as shown and leavning a space 20 between the cut ends. In accordance with the invention the circular leg 15 bears degree markings 17 on the upper surface and inch divisions on the outer perimetric edge 15b thereof. As particularly shown in FIG. 3, the inch markings are subdivided into one ¼ inch divisions for a purpose to be explained. In accordance with a preferred embodiment of the present invention, the lower edge 12a of the remaining base leg 12 measures 14 5/16 inches in length; while the width of the base leg 12, measured from the lower edge 12a to the upper edge 12b, measures 3 1/16 inches. Similarly the width of circular leg 15 measured from the inner periphery 15a to the outer periphery 15b is likewise 3 1/16 inches. In accordance with one embodiment of the invention, the inner periphery 15a of the circular leg segment (see FIG. 4) bears a scale measured in millimeters. The thickness of the truncated protractor, as shown in FIG. 3 and 4, preferably measures about ⅜ inch. The circular leg 15 is radially cut, as indicated, at 16 which would represent a total of, about 110–120 degrees measured from the origin 15c of the circular leg, or 30 degrees from the 90 degree mark situated directly above the extremity 14 of the base leg 12.

In accordance with the present invention the space 20, located between and created by the bias cut 13 and radial cut 16, serves as a convenience feature in the use of the tool device of the present invention, in a manner as will be explained hereinafter.

The modified T-square 30 is composed of a head piece, 31 and a linear, ruler like blade, 32 extending, as shown, vertically down to terminate in a bias cut, 33 yielding a pointed extremity, 34 adapted, as shown, for coincident registration with the pointed extremity 14 of the base leg 12 of the protractor component 11. The T-square head piece 31 includes the curved edge 35 which matches exactly the curvature of the outer perimeter 15b of curved leg 15 whereby it may move slidingly in either of the directions indicated by the arrows 37 much in the manner of a conventional T-square. The correct and desired angular relationship of the edge 36 of blade 32 is achieved by insuring firm contact of the edge 35 in the manner indicated and coincident registration of the terminus 14 of the leg 12 and the terminus 34 of the blade or ruler component 32. With this arrangement the blade will intersect the circular leg in any one of a variety of angular relationships via degree markings 17. It will be appreciated that rather than using the degree scale 17 of the outer circular surface, one may optionally read either the ¼ inch division markings on the outer perimeter 15b of circular leg 15, or the metric division scale on the inner perimeter 15a of the circular leg 15.

Referring now to FIG. 2 the truncated protractor 11 (via cuts 13 and 16) is shown lying in horizontal flat relationship but flipped over from the position as shown in FIG. 1. This reverse position reveals surface which also contains degree marking ranging from zero as shown to approximately 115–125 degrees and again defining a space 20. In accordance with the invention the use of the device in this flipped or reverse position requires a second modified T-square member 40 which is essentially identical to the modified T-square 30 of FIG. 1, excepting that the bias cut 43 is opposite to the bias cut 33 of modified T-square 30, whereby the terminal end 44 is adapted for registration with the terminal end 14 of base leg 12, whereby sliding contact of the head piece 41 as shown, coupled with coincidence of the terminal end 44 of the ruler portion 42 with the end 14 of leg 12 permits the ruler portion to be positioned in any desired angular relationship with respect to the bottom edge of 12a of base leg 12. In all other respects the arrangement as shown in FIG. 2 is identical to that shown in FIG. 1.

It is a feature of the present invention that the dimension of the lower leg and of the width of the lower leg and of the circular leg are selected in order to achieve a particular use advantage. Thus the length of the lower leg is 14 5/16 inches while the width of the base leg and circular leg are each 3 1/16 inch. The application of geometric principals to the circular protractor so constructed yields the resultant that ¼ inch of length on the perimeter 15b corresponds to I degree of angular relationship between the edge 36 of the modified T-square and the base edge 12a of the lower leg. This enables one to determine or to set the modified T-square of any desired angular relationship using the inch scale on the perimeter rather than the degree scale 17 on the upper surface. The geometry thus provides that a distance of 1 inch on the periphery corresponds at 4 degrees; and similarly 2 inches equals 8 degrees. Similarly 5 inches corresponds to 60 degrees while 22½ inches corresponds to 90 degrees where the zero degrees begins at the origin 15c and continues on the perimeter to the 22½ inches mark at the T-square position as shown in either FIG. 1 or FIG. 2.

In a similar fashion, the metric scale on the inner periphery 15a of the circular leg 15 permits the use of the metric scale in setting the angular relationship of the edge 36 of the ruler component 32 of modified T-square 30 with respect to the base leg 12. As indicated earlier, this is made possible by the precise formation of the lower base leg to be 14⅚₁₆ inches in length and the width of the protractor angular and base legs at 3¹⁄₁₆ inches. The geometry of the choice of these values creates a relationship of 5 millimeters of distance on tile inner perimeter corresponding to one degree of arc. Similarly 50 millimeters corresponds to 10 degrees of arc; 100 millimeters corresponds to 20 degrees of arc and 200 millimeters equal 40 degrees of arc, etc.

Referring now more specifically to FIG. 5, the combination tool device of the present invention consisting of the truncated protractor member 11 and modified T-square member 40 (See FIG. 2) is shown resting flushly on the horizontal surface of table T of a radial power saw apparatus 50 shown in dotted/phantom line, as such forms no part of the present invention. The radial power saw apparatus 50 includes a horizontal support boom 51 from which depends appropriately moveable transmission and gear housing 52 and safety shield 53 partially enclosing the upper half of saw blade 54 in vertical angular relationships positioned flushly against the outer edge 46 of ruler blade 42. The radial power saw table T also bears an elongate linear fence 56, including edge 56a against which the base leg 12a of protractor 11 abuts and moves slideably, as desired, with the fence serving as a base reference in setting the angular relationship of the saw blade 54 for the particular job. Thus the radial power saw housing 52 includes an appropriate adjustable nut which when loosened allows the blade to pivot to any desired angular relationship with respect to the fence 56. If the specification or print calls for cutting piece's of expensive teak wood at an angle of 30 degrees from the normal/perpendicular position of the ruler blade 42 as shown in the drawing which defines an angle of 90 degrees with respect to the fence; one simply slides the head piece along the periphery 15b of the circular leg 15a distance of 30 degrees as read on the degree scale 17 on the upper surface. Alternatively, one may slide the head piece a distance of 7.5 inches as measured on the outer periphery 15b intersected by the edge 46 of the ruler 42 of the modified T-square 40. (Thus 30 degrees time ¼ inch equals 7.5 inch) The use of the inch markings on the periphery 15b, rather than degree markings on the fence, is frequently much more convenient for the unskilled operator.

The face of the saw blade 54 in abutment with the edge 46 defines the operative relationship of the blade and the ruler, while the alignment and registration of the terminal ends of the base leg 12 and the ruler 42 coupled with the proper reading on the periphery assures the proper desired relationship of the saw blade; again so long as the base 12 is in firm abutment with fence 56. It then becomes a simple matter to tighten the appropriate nut to fix or set the angular relationship of the blade, whereupon the modified T-square 40 can be removed/lifted from the site, while the modified protractor can be slidably moved along the table with no interference of the saw with any part of the protractor by reason of the space between the bias cut edge 13 of the base leg 12 and the radial cut edge 16 of the circular leg 15.

Without the space identified by the reference numeral 20 in FIG. 2, it would be necessary to raise the entire radial power saw assembly 30 in order to permit removal of the protractor, thus clearing the work area for the actual sawing operation. With the device of the present invention conveniently and quickly removed from the work site; the pieces of expensive material to be cut can be sequentially and quickly urged against the fence and the saw blade while operative components 52 are manipulated to make the desired cut as to meet the requirements of the drawings, specifications etc.

A principal advantage of the device of the present invention is that it permits a job change over to a different saw cut angle in a quick and easy manner, in that, with the table T top surface cleared of any residual waste, the protractor device 11 can be moved flushly along the table top to bring it and the saw 54 into operative relationship as in the manner/relationship shown in FIG. 5, without requiring any vertical height adjustment of the saw. Similarly the protractor device of the present invention maybe utilized in the position shown in either FIG. 2 or FIG. 1 as meets the conditions called for at the job site at that time. It is desirable that the circular leg 15 extends sufficiently beyond the 90 degrees position so that angle adjustments may be made on either side of the 90 degree position (See FIG. 5), without requiring the protractor to be flipped over onto its other side, for example to a position as shown in FIG. 1.

Figure 6:
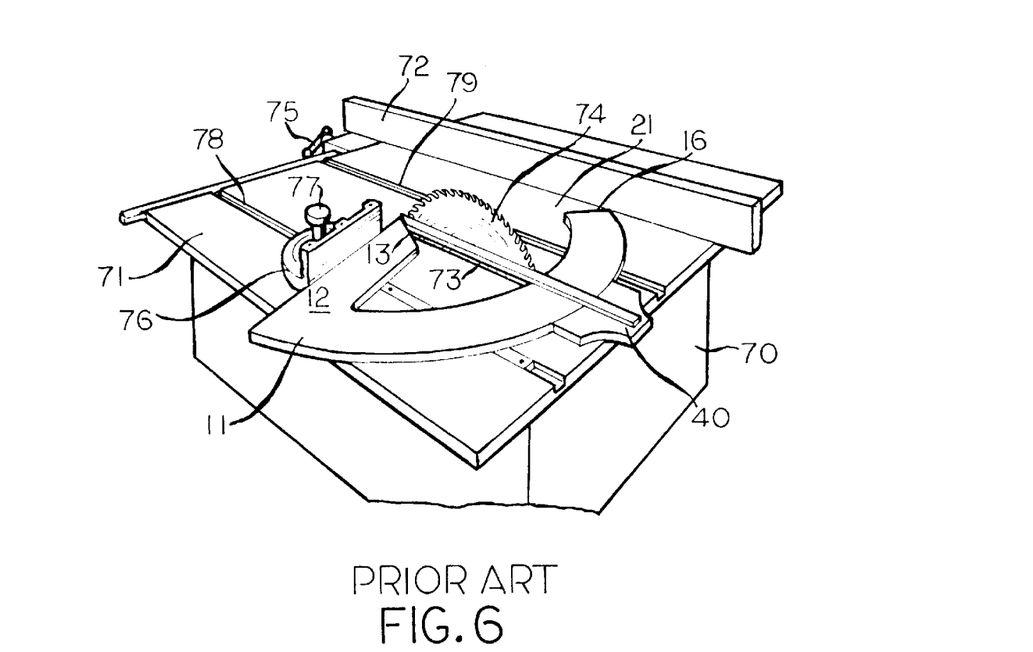
FIG. 6 is a view similar to FIG. 5, but showing an alternative/variant use of the prior art tool to illustrate the scope of usages.

Referring now to FIG. 6, there is shown a somewhat similar bench or table saw 70 featuring a slotted horizontal table top 71, a fixed fence 72 and a slot 73 thru which projects, vertically upwardly, the radial saw blade 74. Reference numeral 75 identifies an adjustment control knob or wheel for the saw assembly. Reference numeral 76 identifies an adjustable fence, via nob 77, which is moveable linearly in slot 78 or slot 79. In this embodiment, the combination tool of the present is composed of the truncated protractor 11 and the modified T-square 40 as shown in mutual operative relationship as in FIG. 2. In this embodiment, the novel tool device is used to adjust the angle of the moveable fence 76 with respect to the angle of the saw blade 74 which is fixed. Here again the space 20 between the cut edges 13 and 16 of the truncated protractor 11 permits easy movement of the protractor 11 which would be impossible if the protractor were not truncated in the manner as proscribed by the present invention. At the same time, the size of the protractor and the interrelationship of the modified T-square and the truncated protractor together with the integral scales, both in degrees, inches, and centimeters permits one to very easily set the angle of the adjustable fence 76 with respect to the saw blade in order that the desired angle of cut on the work piece's can be achieved. Once that is set by manipulation of the modified T-square, in the manner previously described, the adjustable fence is fixed by tightening the knob 77, while the truncated protractor and modified T-square can be quickly and easily removed from the site. Then the combination of the angle adjusted fence 76 and the permanent fence 72, coupled with the appropriate manipulation of the pieces to be cut, allows the desired job to be completed rapidly and accurately.

Figure 7:
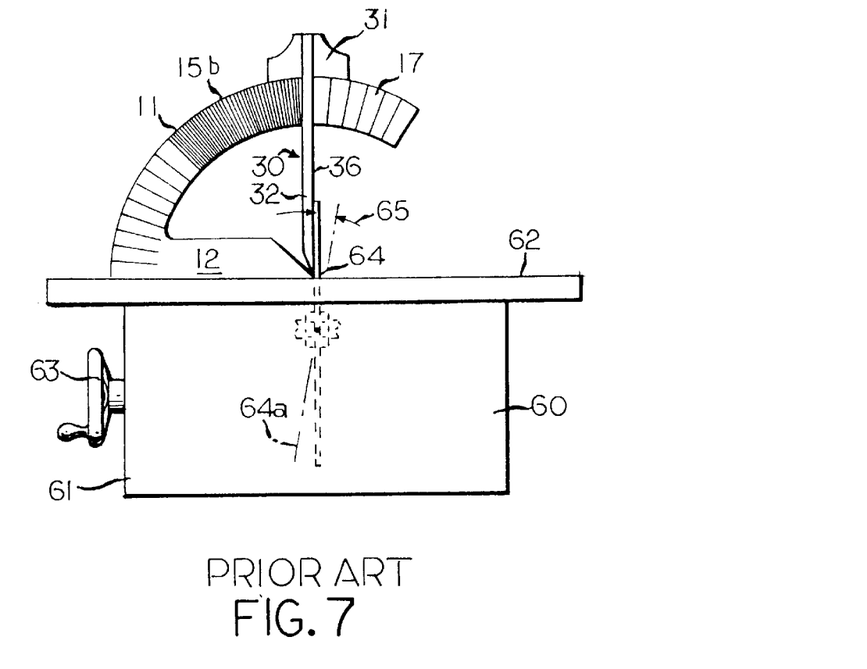
FIG. 7 is a side elevation view, showing in a variant usage, the setting the saw angle as a departure from vertical eg. for bias cuts, etc.

Referring now more specifically to FIG. 7, there is shown a desirable variant use of the tool 11 and T-square 30 or 40 to adjust a saw blade used to bias cut the edge of a work piece. Thus power table saw assembly 60 is inclusive of the housing 61, a work table top 62, control or adjustment wheels 63 and the power saw blade 64 extending vertically upwardly through a suitable opening in the table top for all appropriate operative distance above the surface of said table top 62. In this set up, as described, the device of the present invention consisting of the truncated protractor 11 and the ruler 30 cooperating is shown with protractor 11 vertically upstanding on edge which is in sliding relationship with the table top 62. At the same time the T-square 30 is situated with the head piece directly above the saw blade 64 and with the terminus of the lower leg 12 and the terminus of the ruler 32 in coincident registration, while the edge 36 of ruler 32 is in flush abutment with the vertical surface of the saw blade 64. Now, in the position as shown, the ruler 32 is coincident with a 90 degree reading on the upper surface 17 of the circular leg. At the same time the ruler intersects 15b to yield an inch reading of 22.5 inches. In this view the arrows 65 designate a desired change in angular relationship of the power saw blade 64 from the vertical or 90 degree angle, shown in solid line, to an angle defined by the reference numeral 64a, in dotted line. In this application suitable loosening of the saw blade coupling would permit the blade 64 to be tilted to the position identified as 64a. Now with the device, the precise angle desired to achieve position 64a can be achieved by moving the head piece 31 to the right while maintaining sliding contact with the peripheral edge 15b and registration of the terminal ends of leg 12 and ruler 32 until the precise reading corresponding to that desired by the print or specs is readable in degrees on the surface 17 or on inches on the periphery 15b. When the desired angle is achieved the saw blade adjustment is tightened to secure the blade at the desired angle whereupon the device T-square 30 and protractor 11 can be easily removed. Clearly, the modified eg. truncated, protractor construction of the present invention permits the achievement of the precise angle in a swift and convenient manner which is not possible with any other device. Accuracy and speed are achieved in adjusting the angle of the saw blade 64 respecting the table top 62 as illustrated in order that a plurality of uncut stock pieces of wood or other material maybe sequentially manipulated through the sawing operation to yield a precise bias edge cut without expensive trial and error.

The foregoing detailed description taken in conjunction with the drawings reveals both the uniqueness and the utility of the tool device of the present invention. As can further be seen the tool device is composed of a number of unique features which operate independently and cooperatively to provide a tool device of utility, and, in addition, manifest unusual capabilities with the features of novelty combined in a single tool device of the invention.

In no particular order, the novel features are seen to include the truncated nature of a fairly conventional flat protractor which permits the device to lay flat on the horizontal surface of a table saw and its easy movability without lifting into a position essentially surrounding the saw blade extending vertically above the surface of the table. The cooperating modified T-square member with its head piece in sliding relationship with the outer perimeter is adapted to have its ruler/blade in flush abutment with the upstanding vertical surface of the saw blade such that the specific degree markings on the protractor can be read at the intersection of the T-square ruler with the markings on the upper surface of the protractor. It will be recognized that the degree markings are present on both flat surfaces of the angular leg near the perimeter, such that the protractor can be flipped over to meet the exigent circumstances. The particularly useful feature of the present invention that the protractor is fabricated to a physical size such that the linear (elongate) leg of the truncated protractor measures 14 5/16 inches. By reason thereof, of course, the curved leg has a perimeter corresponding to a circle having a radius of 14 5/16 inches. The latter dimension was selected because a circle of such radius has a circumference of very close to 90 inches. In a circle of 90 inches circumference, each 1/4 inch corresponds to one degree eg. 90 degrees divided by 360 degrees equals 0.25 inches; which is the same as 1/4 inch. In accordance with the invention the perimeter of the modified protractor of the invention bears or is inscribed with inch markings subdivided into 1/4 inch divisions.

As indicated earlier this translates to 4 degrees per inch, etc. which relationship is of extreme utility for a workman operating a radial power saw to calculate the proper setting of the blade angle in a precise manner with respect to the straight edge of the elongate leg. The latter in turn is, of course, lying flush against a fixed or adjustable reference "fence" normally present on the table of a radial bench type power saw.

Contemplating further, constructional features desired to enhance the utility of the tool device it was envisioned that the base leg should coincide in length with the radius via the bias cut (as shown in the drawings) to designate a pointed end corresponding to the center of the corresponding circle. This feature cooperates with the bias end cut of the ruler or blade portion of the modified T-square to provide preciseness with the pointed ends in registration as described earlier to assure consistency in readings in degrees or inches as may be most suitable to the particular craftsman.

While the protractor could have been truncated at the 90 degree mark and thus constitute one half of a protractor; it was concluded that the circular leg should extend, most preferably, beyond 90 degrees in order to facilitate use of the modified protractor, and particularly the location of the head piece in the region of the 90 degree marking, permitting readings to approach 10, 15 and even 20 degrees beyond the 90 degree mark without the necessity of having to invert the protractor on to its opposite surface.

In a preferred embodiment, the width of the base leg and the curved leg were set at a dimension of approximately 3 1/16 inch. This dimension coupled with the 14 5/16 dimension of the base leg (and radius) and the geometry of the circle in question allows marking of the inner perimeter with a scale of metric units according to a relationship of 5 millimeters per 1 degree of arc, etc. Thus 20 degrees corresponds to 100 millimeters; 40 degrees corresponds to 200 millimeters and so forth. Indvidually, and together, the features, as above described, provide a novel tool device for use in conjunction with a radial bench type power saw. Particularly valuable, of course, is the preciseness of measurement which can be achieved with consistency whereby the device is of extreme utility in the use of the table power saw in cutting expensive materials wherein loss due to waste or mistakes etc etc would otherwise result in increase costs contrary to the savings that are possible with the device of the present invention.

It will be understood that the modified/truncated protractor component of the tool device of the present invention may be fabricated of a variety of materials. Both due to ease of fabrication and toughness a variety of plastic would appear to be a logical choice, particularly since plastic lends itself to molding. Further molding can also be employed to impart the markings both of the angle division markings on the surface near the perimeter, the inch markings on the edge perimeter and the millimeter markings on the inner periphery. Although not shown, it would be convenient to have the linear leg bear length dimensions along its lower edge.

Given the nature of modified T-square members 30 and 40 (FIG. 1 and FIG. 2); it would be appropriate to fabricate these items of a plastic material. Given the toughness and ease of fabrication it is also envisioned that the T-square would likely be fabricated in two pieces, in the interest of economy followed by securement.

While thickness of the components of tool device of the present invention is not seen as critical, it would appear that practicality suggest a viable range from ¼ to ½ inch in thickness; with ⅜ inch being preferred as proportionately appropriate to the size of the overall device.

From the foregoing specification and drawings, it will be appreciated that many obvious changes and modifications will become apparent to those skilled in the art and all such obvious modifications are intended to be included within the scope of the present invention unless such would do violence to the scope of the appended claims.

I claim:

1. A tool/device, for setting/adjusting the cutting angle of the circular saw blade of a radial, bench-type, power saw comprising, in combination;

a generally flat, truncated protractor member, and at least one cooperating T-square member, comprising an elongate blade and a connected head piece, said truncated protractor member comprising a primary elongate/base leg and, connected at one end, a curved leg, defining the arc of a circle, extending at least 90 degrees, but less than 180 degrees from said elongate/base leg, said curved leg having upper and lower surfaces connected by a curved peripheral edge, said base leg defining/corresponding to the radius of said arc and measuring 14 5/16 inches;

said head piece including working edge surface congruent to and movable in slidable relationship with the perimeter of said curved leg, and said blade and head piece being constructed and arranged so that said working edge surface is exposed for sliding contact with said curved leg regardless of which side of said blade is up or down.

2. The tool device, as claimed in claim 1, wherein said curved leg bears degree markings on the upper surface.

3. The tool device, as claimed in claim 2, wherein the terminal end of said base leg is bias cut to terminate in an index corresponding to the center of said arc.

4. The tool device, as claimed in claim 3, wherein said T-square includes near ruler member terminating in a bias cut index adapted to coincide with index of said base leg, as said T-square moves in contacting relationship about the curved leg perimeter.

5. A tool device, as claimed in claim 3, wherein the curved leg bears quarter inch markings along the peripheral edge.

6. The tool device, as claimed in claim 5, wherein said curved leg measures 3 1/16 inch in width.

7. The tool device, as claimed in claim 6, wherein said base leg measures 3 1/16 inch in width.

8. The tool device, as claimed in claim 7, wherein the inner circular edge of said curved leg bears markings in millimeters and in 5 millimeter spacings.

9. A tool device, for use with a table, power saw unit having a circular saw blade extending above said table comprising; in combination a modified protractor, having a central opening, devoid of adjoining portions of the straight leg and circular leg of said protractor, thereby leaving/defining a space/passageway leading to said central opening and a modified T-square having a curved head piece conforming to the curvature of the remaining curved leg of the protractor and adapted for sliding circular movement thereon and a connected elongate blade, having opposed surfaces, said curved leg portion containing degree markings on its flat upper surface adjacent to the perimeter, said space/passageway accommodating sliding movement of said protractor on said table and into surrounding relationship with said circular saw blade situated in said central opening, said blade being constructed and arranged so that said blade can be located with either flat surface in the down position.

10. A tool device, as claimed in claim 9, wherein said modified T-sqaure includes a connected, ruler/blade extending toward the center of said straight leg, corresponding to the center of the circle defining said curvature.

11. A tool device, as claimed in claim 10, wherein said protractor having a circular curvature corresponding to a radius of substantially 14 5/16 inches.

12. A tool device, as claimed in claim 11, wherein said curved leg portion includes, additionally, ¼ inch division markings on its outer edge periphery.

13. A tool device, as claimed in claim 12, wherein each of said straight leg and circular leg measure 3 1/16 inch in width.

14. A tool device, as claimed in claim 13, wherein said curved leg portion includes an inner edge periphery which bears along its length divisions measured in millimeters.

15. The combination of a truncated protractor having an elongate linear base leg with a curved leg connected thereto, said protractor having a central opening, created by a radial line severing a portion of the linear base leg and the connected curved segment, thereby defining a void or passageway connecting to said opening and a modified T-square featuring a curved head piece matching the curvature of said protractor, and a connected ruler/blade, having opposed surfaces, extending radially toward the center of said truncated protractor, said ruler blade being constructed and arranged so that either surface can be up or down, without disturbing the head piece match with curvature of said protractor.

16. The combination of claim 15 wherein said protractor has a circular edge bearing ¼ inch divisions.

17. The combination of claim 16 wherein said protractor features a curved leg of which the curve is a segment of a circle measuring substantially 90 inches in circumference.

* * * * *